July 13, 1937.                    R. BOCK                    2,087,081
                        OPTICAL MAGNIFYING APPARATUS
                            Filed Nov. 14, 1934
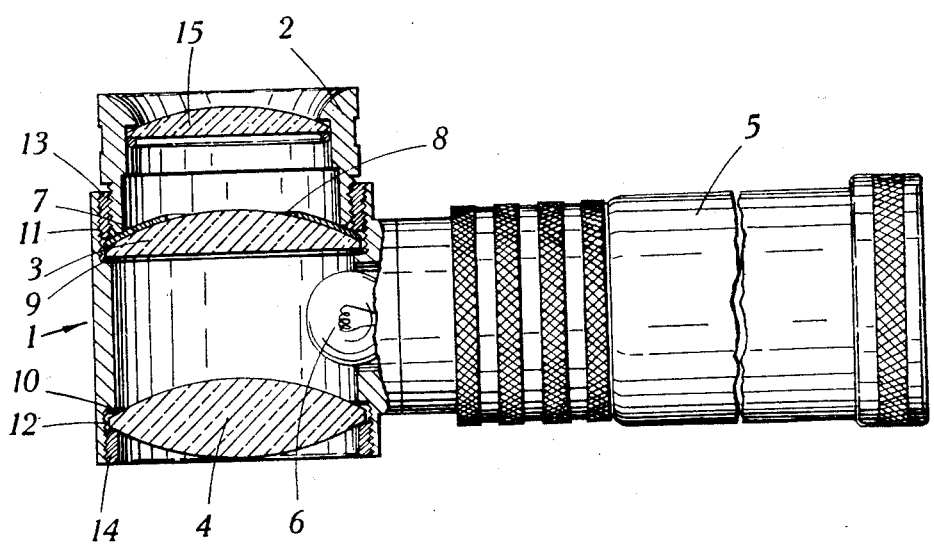
INVENTOR
Richard Bock.
BY
Ely & Pattison.
ATTORNEYS Patented July 13, 1937

2,087,081

UNITED STATES PATENT OFFICE 2,087,081

OPTICAL MAGNIFYING APPARATUS

Richard Bock, London, England

Application November 14, 1934, Serial No. 752,916
In Great Britain November 17, 1933

3 Claims. (Cl. 88—39)

This invention relates to improvements in or in connection with optical magnifying apparatus, and has for its purpose to provide for the better illumination of the object under consideration, and simpler and more economical production.

It is already known that magnifying apparatus employing two or more lenses, can be constructed wherein an electric incandescent lamp is placed between the lenses, and an annular mirror is employed with a view to directing the light emitted by such lamp on to the object under examination.

According to the present invention, I employ an apertured mirror, preferably having a curved reflecting surface, and I combine it with one of the lenses used, by adapting it to the surface thereof so that it serves to direct the light rays from the lamp on to the object under examination, which is viewed through the aperture.

In the drawing, the figure represents a side elevational view of the invention with parts broken away and shown in section.

Referring to the drawing by reference characters, the numeral 1 designates a tubular body having annular shoulders 9 and 10 adjacent opposite ends, the inner walls of the body outward of the shoulders 9 and 10 being screw threaded as at 11 and 12 respectively. Seated against the shoulders 9 and 10 are magnifying lenses 3 and 4 respectively, and which are held seated thereagainst by externally screw threaded retaining rings 13 and 14, which rings are threaded to the threaded portions 11 and 12 of the tubular body 1. The retaining ring 13 is also internally screw threaded for threadedly receiving the inner threaded end of an eye piece 2 having a lens 15 mounted therein. Overlying the outer surface of the lens 3 which is shown in the drawing as being convex, is a concavo-convex reflecting element 7 having a central aperture 8. The element 7 is shown as a separate part from the lens 3 and has an inner mirrored surface and the same is held in position by reason of its peripheral edge being interposed between the lens 3 and the inner end of the retaining ring 13 and eye piece 2.

Attached to the body 1 and extending at right angle thereto is a tubular handle 5 adapted to hold a dry battery which supplies current to an electric lamp 6 contained in a socket within the handle adjacent the inner end thereof, and the said lamp projects into the body 1 but out of the plane of the opening 8 so that the rays of the lamp may strike the inner surface of the lens 3 while the lens in turn shields the direct light rays from the eye of a user. The rays of light from the lamp will then, to a very large extent, be reflected by the mirror element 7 on to the object, which will therefore be more brilliantly illuminated. The size of the aperture at 8 and the disposition of the lamp 6 relative thereto will of course be such that the eye is screened from the light of the lamp.

The reflecting surface can of course be arranged on the lower side of the lens 3 if desired, and in this connection it may be remarked that it is not by any means essential for said reflecting surface to be curved since it can just as well be combined with a plane surface of a lens.

The reflecting surface may be conveniently formed as a coating upon the surface of the lens itself in any well-known way, or it may be a separate component in the form of a metal or other mirror suitably formed so as to conform to the surface of the lens. In either case a separate diaphragm may be dispensed with.

The source from which the current for the electric lamp is obtained is of course immaterial to the present invention and although a dry battery in the handle is usually most convenient the current might, for instance, be taken from existing supply mains through a transformer or from a separate battery, through a cable.

I claim:

1. A magnifying instrument comprising in combination, a tubular body, a pair of spaced magnifying lenses mounted within said tubular body adjacent opposite ends thereof, an eye-piece mounted on said tubular body at one end thereof, a mirror element of a shape corresponding to one side of that lens nearest the eye-piece and in snug contact with said lens, said mirror element being separable from said lens and having a central aperture therein, a handle extending from the side wall of said tubular body and having an electric lamp socket opening thereinto, and an electric lamp mounted in said electric lamp socket and being partially disposed within said tubular body between said pair of lenses but outwardly of the plane of the edge of said aperture whereby the mirror element shields the eye of a user from viewing said electric lamp when peering axially through the eye-piece and central aperture and reflects the rays of light from said electric lamp in the direction of the other of said lenses for illuminating an article under observation by use of the instrument.

2. A magnifying instrument comprising in combination, a tubular body open at opposite ends and having an internal shoulder adjacent one end thereof and an internal screw threaded portion outwardly of said shoulder, a lens mounted in the opposite end of said tubular body, a second lens seated against said shoulder, a reflector element separate from and conforming to the shape of one side of said second lens and snugly fitting thereagainst, said reflector element having a central aperture therein, a retaining ring threaded to the internal screw threaded portion and cooperating with said shoulder to hold said reflector element and its engaging lens in a fixed clamped relation, an eye-piece threaded to said retaining ring, a handle extending from the side wall of said tubular body and having an electric lamp socket opening into said body intermediate the lenses, and an electric lamp mounted in said socket and disposed outwardly beyond the plane of the edge of the aperture in said reflector element whereby the reflector element shields the eye of a user from viewing said electric lamp when peering axially through the eye-piece and central aperture and reflects the light rays from said electric lamp in the direction of the first mentioned lens for illuminating an article under observation by use of said instrument.

3. A magnifying instrument comprising in combination, a tubular body, a pair of magnifying lenses mounted within said tubular body adjacent opposite ends thereof, one of said lenses having an inner flat side and an outer convex side, a concavo-convex mirror element separable from said last mentioned lens and snugly fitting against the convex side thereof, said mirror element having a central aperture therein, an eye-piece mounted on that end of said body adjacent said mirror element, a handle extending from the side wall of said tubular body and having an electric lamp socket opening thereinto, and an electric lamp mounted in said electric lamp socket and being partially disposed within said tubular body between said pair of lenses but outwardly of the plane of the edge of the aperture in said mirror element whereby the mirror element shields the eye of a user from viewing said electric lamp when peering axially through said eye-piece and central aperture and reflects and concentrates the rays of light from said electric lamp in the direction of the other of said pair of lenses for illuminating an article under observation by the use of the instrument.

RICHARD BOCK.